April 28, 1925.

C. LUNDGREN ET AL 1,535,427

SLIDE FOR EXTENSION TABLES

Filed May 7, 1923

Inventors

Conrad Lundgren
Ernest Hedin

By Clarence D. Walker.

Their Attorney

Patented Apr. 28, 1925.

1,535,427

UNITED STATES PATENT OFFICE.

CONRAD LUNDGREN AND ERNEST HEDIN, OF JAMESTOWN, NEW YORK.

SLIDE FOR EXTENSION TABLES.

Application filed May 7, 1923. Serial No. 637,081.

*To all whom it may concern:*

Be it known that CONRAD LUNDGREN and ERNEST HEDIN, citizens of the United States, residing at Jamestown, in the county of Chautauqua and State of New York, have invented certain new and useful Improvements in Slides for Extension Tables, of which the following, taken in connection with the accompanying drawings, is a specification.

This invention relates to an improvement in a slide for an extension table, and more particularly in a slide of the well known cross type made of two separate plates at right angles to each other.

The chief object of this invention resides in the provision in a table slide made of two separate plates of an opening at the center through which a screw for securing the slide in one of the extension bars is inserted, and more particularly in the provision in the crossed plates of a cylindrical opening in each plate, so arranged that when the parts are assembled with the extension bar, the head of the screw bears against the edge of the opening in each of the plates, whereby the plates are held against movement in either direction without being pierced by the screw.

A further object of this invention is the provision in the extension bar of a stop by which the opening action of the extension bars is limited.

Other objects reside in the particular details of construction as will appear from an examination of the following description taken in connection with the drawings which form a part thereof, and in which Fig. 1 is a plan view of the slide bars of an extension table embodying this invention;

Figure 1:
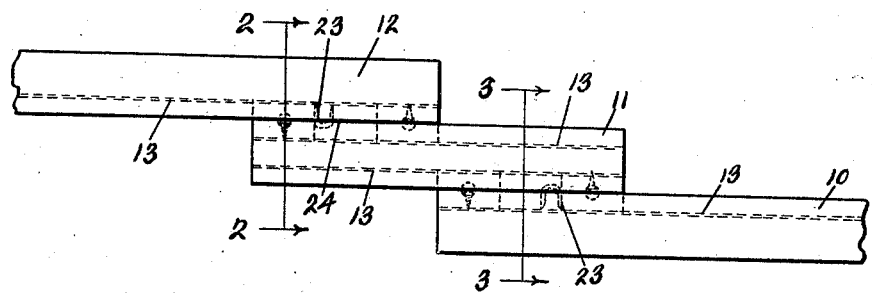

Referring to the drawing, the reference numerals 10, 11 and 12 are used to designate a set of slide bars for an extension table. On the adjacent faces of the slide bars 10, 11 and 12 are formed grooves 13 at right angles to each other, these grooves meeting along a common line at the center of the adjacent faces of each pair of slide bars.

Figures 4, 5:
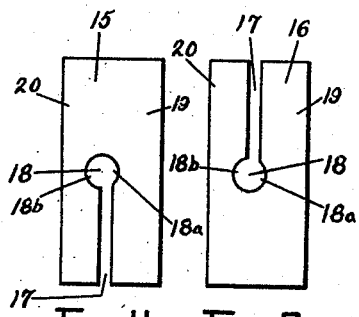
Figs. 4 and 5 are elevation views of the two plates, which form the cross slide.
Figure 6:
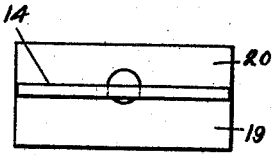
Fig. 6 is one view of the cross slide; and, Fig. 7 is another view of the cross slide.

Mounted at one end of each adjacent pair of grooves 13 in each bar 10, 11 and 12 is a cross slide 14. This slide is made up of plates 15 and 16, each of which is provided with a slot 17 terminating in a circular aperture 18 as shown particularly in Figs. 4 and 5. One wall of the slot 17 is preferably midway the sides of the bar and the aperture 18 is, as shown in the drawing, somewhat offset from the center. The advantage of this will appear hereinbelow.

Figure 7:
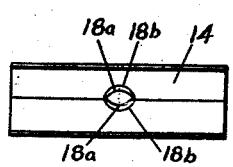

The plates 15 and 16 are interlocked, the solid portion of each bar lying in the slot 17 of the other, so that they will be at right angles to each other, and the apertures 18 of the two plates meet, as shown in Fig. 7, to form an opening having a tapered ellipsoidal contour. Since the slots 17 do not equally divide the plates 15 and 16, the wings of the slide will differ in width, those designated as 19 being wider than those designated as 20.

When the cross slide is mounted in the bar at the proper position, it is held therein by means of a screw 21 which enters the point between the grooves 13, being inserted through the opening provided by the intersection of the two apertures 18. Since the apertures 18 are not at the centers of the plates, it follows that when the parts are assembled, the edges 18$^a$ of the apertures 18 in the wings 19 of the slide, which are to be secured to the bar, are nearer than the edges 18$^b$ of the apertures in the wings 20 of the slide. (See Figs. 2 and 7.)

Figure 2:
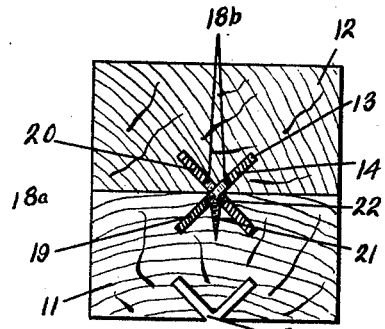
Fig. 2 is a cross section on an enlarged scale taken along the line 2—2 of the Fig. 1.

As indicated in Fig. 2 particularly, the head 22 of the screw 21 will pass freely between the edges 18$^b$, and will bear equally against the edges 18$^a$ of the apertures 18 and secure the wings 19 to the bar 11. The space between the edges 18$^b$, however, permits the passage of not only the head of the screw, but also the blade of the screw driver, so that it may freely engage the head of the screw, thus facilitating the assembling and disassembling of the parts. The head 22 of the screw 21 thus without piercing either crossed plate of the slide 15 and 16 holds the wings against any movement in the bar, either longitudinally or transversely.

Figure 3:
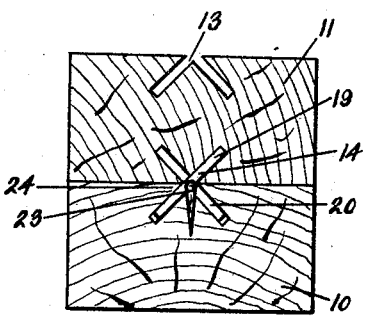
Fig. 3 is a cross section on an enlarged scale taken along the line 3—3 of Fig. 1.

The parts are assembled by fixing the slides 14 at the end of the grooves 13 in each of the bars 10, 11 and 12, and then, by moving the bars longitudinally, inserting the wings 20 of the fixed slides in the grooves in the contiguous faces of the adjacent bars. (See Figs. 1, 2 and 3.)

In order to determine the limit of expansion of the extension bars, suitable staples 23 are imbedded in the peak 24 between the grooves 13 of one bar of each set, here shown as bars 10 and 12. The head of the staple 23 arises slightly above the face of the bar, to which it is secured and thus strikes against both members of the cross slides in the bar 11, so that the blow will have no tendency to cause one plate to shift relatively to the other and cause uneven pressure against the screw 19.

While one embodiment only has been shown and described of this invention, we are not to be limited thereto since it is obvious that others may be made without departing from the spirit and scope of the invention as set forth in the following claims.

Having thus set forth our invention what we claim as new and for which we desire protection by Letters Patent is:

1. A table slide comprising two plates, each plate having a longitudinal slot and a circular opening therethrough at the inner end of the slot, the plates being assembled by means of said slots in the form of a cross, the two openings intersecting to provide a tapering ellipsoidal opening through said slide.

2. The combination with an extension bar of a table having longitudinal grooves therein at right angles to each other, of a slide in the form of a cross, two wings of which enter said grooves, having an ellipsoidal opening at the center thereof through which opening a screw is passed to secure said slide to said extension bar and a second extension bar having similar longitudinal grooves into which the other two wings of said slide enter.

3. The combination with an extension bar of a table having longitudinal grooves therein at right angles to each other, of a slide consisting of two plates, each plate having a longitudinal slot and a circular opening therethrough at the inner end of the slot, the plates being assembled by means of said slots in the form of a cross, the two openings intersecting to provide a tapering ellipsoidal opening through said slide, said slide being positioned upon said bar by placing in said grooves the two wings of said slide defining the smaller end of said opening, a screw in said bar with its head bearing upon the edges of said opening in said wings, and a second extension bar having similar grooves which the other two wings of said slide enter.

4. The combination with an extension bar of a table, having longitudinal grooves at right angles to each other, a slide in the form of a cross, two wings of which lie in said grooves, a second extension bar having similar grooves in which the other two wings of said slide lie, means for fixing said slide in position in said first bar, whereby the slide reciprocates in the grooves of said second bar when said bars are shifted longitudinally of each other, and a stop in said second bar between the grooves therein against which said slide strikes thereby limiting its movement in one direction.

In testimony whereof we have affixed our signatures.

CONRAD LUNDGREN.
ERNEST HEDIN.